US010560960B2

(12) United States Patent
Liu et al.

(10) Patent No.: US 10,560,960 B2
(45) Date of Patent: *Feb. 11, 2020

(54) METHOD AND APPARATUS FOR DATA TRANSMISSION (71) Applicant: Telefonaktiebolaget LM Ericsson (publ), Stockholm (SE)

(72) Inventors: Jinhua Liu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,403

(22) Filed: Jun. 22, 2018

(65) Prior Publication Data

US 2018/0376502 A1 Dec. 27, 2018

Related U.S. Application Data (63) Continuation of application No. 15/112,745, filed as application No. PCT/CN2015/091578 on Oct. 9, 2015, now Pat. No. 10,021,719.

(51) Int. Cl.
*H04W 84/12* (2009.01)
*H04W 74/02* (2009.01)
(Continued)

(52) U.S. Cl.
CPC ........... *H04W 74/02* (2013.01); *H04W 48/08* (2013.01); *H04W 56/00* (2013.01); *H04W 72/0446* (2013.01); *H04W 72/121* (2013.01)

(58) Field of Classification Search
CPC ..... H04W 74/02; H04W 48/08; H04W 56/00; H04W 72/0446; H04W 72/121
(Continued)

(56) References Cited

U.S. PATENT DOCUMENTS

2014/0031054 A1 1/2014 Zou et al.
2014/0112289 A1 4/2014 Kim et al.
(Continued)

FOREIGN PATENT DOCUMENTS

CN 104780544 7/2015
CN 104796934 7/2015
(Continued)

OTHER PUBLICATIONS

Supplementary European Search Report for Application No. / Patent No. 15905681.1-1875 / 3202196 PCT/CN2015091578—dated Oct. 6, 2017.
(Continued)

*Primary Examiner* — Sai Ming Chan
(74) *Attorney, Agent, or Firm* — Baker Botts, LLP (57) ABSTRACT Embodiments of the present disclosure provide a method at a communications device of a first type that is operable on both a licensed carrier and an unlicensed carrier. The method comprises performing channel sensing on the unlicensed carrier, at different sensing slots within a time duration, for respective links directed to at least two communications devices of a second type that are operable on both the licensed carrier and the unlicensed carrier. The time duration is specified as a portion of a subframe in a frame structure used on the licensed carrier. The method also comprise scheduling transmission on a channel that is determined to be available based on corresponding channel sensing. Correspondingly, there is also provided an apparatus embodied at or as at least part of a communications device of a first type, e.g. a base station that is operable on both a licensed carrier and an unlicensed carrier.

18 Claims, 10 Drawing Sheets

(51) Int. Cl.
*H04W 56/00* (2009.01)
*H04W 48/08* (2009.01)
*H04W 72/04* (2009.01)
*H04W 72/12* (2009.01)

(58) Field of Classification Search
USPC .......................................................... 370/336
See application file for complete search history.

(56) References Cited

U.S. PATENT DOCUMENTS

| | | | |
|---|---|---|---|
| 2014/0341207 A1 | 11/2014 | Bhushan et al. | |
| 2016/0338096 A1* | 11/2016 | Vajapeyam | H04L 1/1861 |
| 2017/0041805 A1* | 2/2017 | Chandrasekhar | H04W 74/0816 |
| 2017/0251375 A1* | 8/2017 | Yang | H04W 16/14 |

FOREIGN PATENT DOCUMENTS

| | | |
|---|---|---|
| WO | 2015/054294 | 4/2015 |
| WO | 2015 081248 A1 | 6/2015 |

OTHER PUBLICATIONS

PCT Written Opinion of the International Searching Authority and PCT International Search Report for International Patent Application No. PCT/CN2015/091578—dated Jul. 1, 2016.
Office Action issued by the Government of Bangladesh, Department of Patents, Designs & Trademarks Ministry of Industries for Patent Application No. 189/2016/1596—dated Sep. 20, 2017.

* cited by examiner

METHOD AND APPARATUS FOR DATA TRANSMISSION

PRIORITY

This application is a continuation, under 35 U.S.C. § 120, of U.S. patent application Ser. No. 15/112,745 filed on Jul. 20, 2016, which is a U.S. National Stage Filing under 35 U.S.C. § 371 of International Patent Application Serial No. PCT/CN2015/091578 filed Oct. 9, 2015, and entitled "METHOD AND APPARATUS FOR DATA TRANSMISSION both of which are hereby incorporated by reference in their entirety.

TECHNICAL FIELD

The non-limiting and exemplary embodiments of the present disclosure generally relate to wireless communications, and specifically to a method, an apparatus, and a computer program product for data transmission between communications devices operable on both a licensed carrier and an unlicensed carrier.

BACKGROUND

This section introduces aspects that may facilitate better understanding of the present disclosure. Accordingly, the statements of this section are to be read in this light and are not to be understood as admissions about what is in the prior art or what is not in the prior art.

The fast uptake of the Third Generation Partnership Project (3GPP)-Long Term Evolution (LTE) in different regions of the world shows both that demand for wireless broadband data is increasing, and that LTE is a successful platform to meet that demand. The existing and new spectrum licensed for exclusive use by International Mobile Telecommunications (IMT) technologies will remain fundamental for providing seamless coverage, achieving the highest spectral efficiency, and ensuring the highest reliability of cellular networks through careful planning and deployment of high-quality network equipment and devices.

In order to meet the ever increasing data traffic demand from users, particularly in concentrated high traffic buildings or hot spots, more mobile broadband bandwidth will be needed. Given a large amount of spectrum available in unlicensed bands around the globe, the unlicensed spectrum is more and more considered by cellular operators as complementary means to augment their service offering. While the unlicensed spectrum can never match the qualities of the licensed regime, solutions that allow an efficient use of it as a complement to licensed deployments have a potential to bring a great value to 3GPP operators, and ultimately to the 3GPP industry as a whole. This type of solutions would enable operators and vendors to leverage the existing or planned investments in LTE/Evolved Package Core (EPC) hardware in radio and core networks.

Recently, an emerging technology, referred to as Licensed-Assisted Access (LAA), has become a hot topic in 3GPP studies. An LAA framework builds on carrier aggregation solutions introduced in LTE Release-10 to access the additional bandwidth in the unlicensed spectrum. In an LAA system, an access point (AP) may serve user equipment (UE) via both a licensed carrier and an unlicensed carrier. The licensed carrier maintains a radio connection, while the unlicensed carrier is mainly used for data rate boost. In the LAA system, transmissions on the licensed carrier may be performed based on resource scheduling at the AP according to specifications as defined for LTE systems, while transmissions on the unlicensed carrier may follow the listen before talk (LBT) mechanism as defined for WiFi systems.

Figure 1:
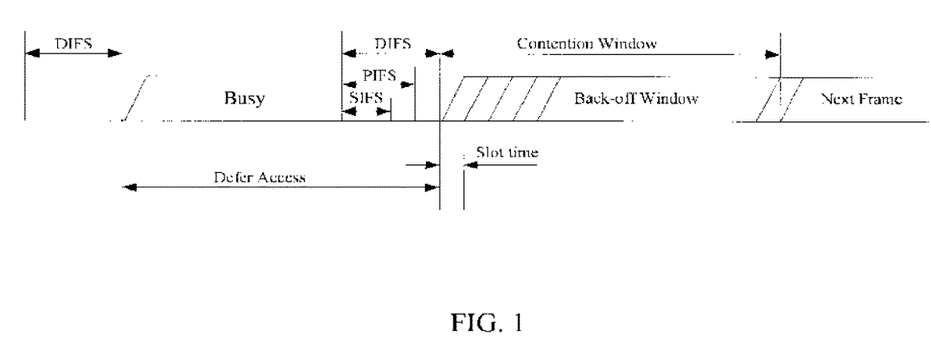
FIG. 1 shows an example of the LBT mechanism as defined in IEEE 802.11.

The LBT mechanism is widely applied in WiFi systems aiming to avoid collisions between neighboring radio links. FIG. 1 shows an example of the LBT mechanism as defined in IEEE (Institute of Electrical and Electronics Engineers) 802.11. According to the LBT mechanism, when there is data for transmission from a transmitter to a UE, the transmitter shall first sense a channel for a radio link directed to the UE for a certain time period, e.g. for DIFS (Distributed Coordination Function (DCF) inter-frame space), PIFS (Point Coordination Function (PCF) inter-frame space) or SIFS (Short Inter-frame Space). If the channel is sensed to be busy, then the transmitter shall wait e.g. for a Defer Access period as shown in the figure. If the channel is sensed to be idle, then the transmitter may generate a random back-off time period, which may be referred to as a contention window or a back-off window, as shown in the figure. The channel may be determined to be available for data transmission only if the channel is sensed to be idle during the whole back-off window. Once the channel is determined to be available, the transmitter may start to transmit data over the channel to the UE.

In order to improve system performance of WiFi systems, the beamforming technology has been introduced into the WiFi systems. With high gain beamforming, directional channel sensing with the conventional LBT has been investigated so as to improve spatial multiplexing. As such, a transmitter may perform channel sensing for different directions so as to determine channel availability for respective links in these directions.

In terms of complexity control, analog beamforming antennas are preferably adopted to implement beamforming. For analog beamforming, a precoding matrix is applied by using analog phase shifters after digital-to-analog (DA) conversion. Thus, usage of analog beamforming antennas may reduce the number of Analog-to-Digital (AD)/DA converters. Since the cost of AD/DA converters is very high and power efficiency may also form a challenge when too many AD/DA converters are applied, analog beamforming antennas are preferred in implementation of beamforming. However, an analog beamforming antenna can provide a very limited number of Tx/Rx Radio Frequency (RF) chains, while one Tx/Rx RF chain can only generate one main beam and it is impractical to use the same RF chain to generate multiple main beams for multiple users simultaneously since the users are usually located in different directions. For an AP equipped with an analog beamforming antenna, the number of beams that can be generated by the AP is up to the number of TX RF chains of the AP antenna and the number of directions that the AP can sense is up to the number of RX RF chains of the AP antenna.

For LAA systems, when one AP equipped with an analog beamforming antenna serves multiple users over a licensed carrier and a shared unlicensed carrier, the AP may need to perform directional channel sensing to determine channel availability before data transmission to each user on the unlicensed carrier. With the limitation of Rx RF chains, the directional channel sensing may have to be performed sequentially and meanwhile complies with the LTE frame structure used on the licensed carrier, which may cause a large overhead and resource waste, as explained with reference to FIG. 2, FIG. 3A and FIG. 3B.

Figure 2:
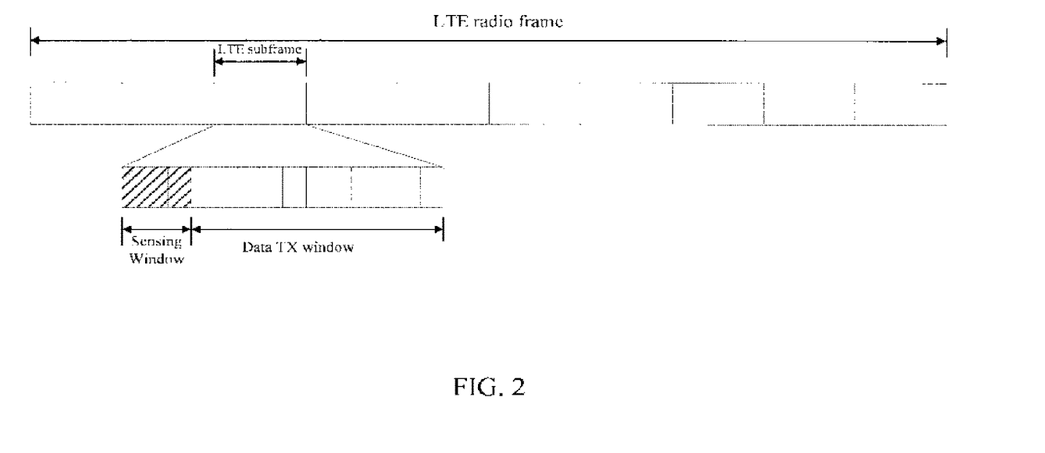
FIG. 2 shows an LTE frame structure.

FIG. 2 shows an LTE frame structure as used on the licensed carrier. As shown, an LTE radio frame has 10 LTE subframes, while each subframe may have 14 symbols.

Usually, the first three symbols may be used for channel sensing, after which data transmission may be performed.

Figure 3A:
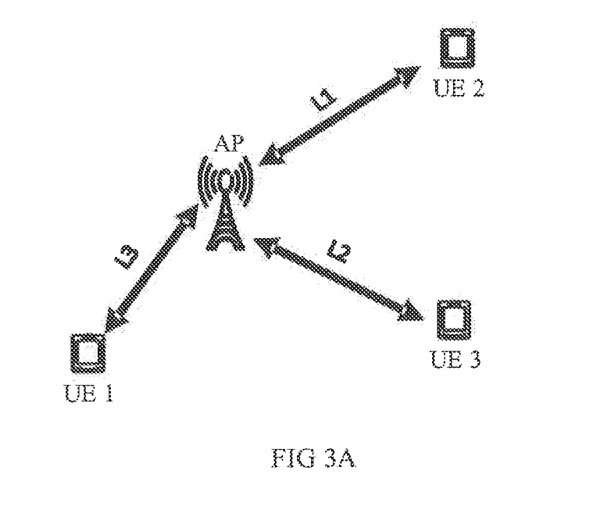
FIG. 3A shows an example of one AP serving three UEs by establishing three radio links L1, L2 and L3 in different directions.

FIG. 3A shows an example of one AP serving three UEs by establishing three radio links L1, L2 and L3 in different directions. It is assumed that the AP equipped with an analog beamforming antenna has a single RX RF chain to serve the three UEs and can sense channels for links L1, L2 and L3 sequentially.

Figure 3B:
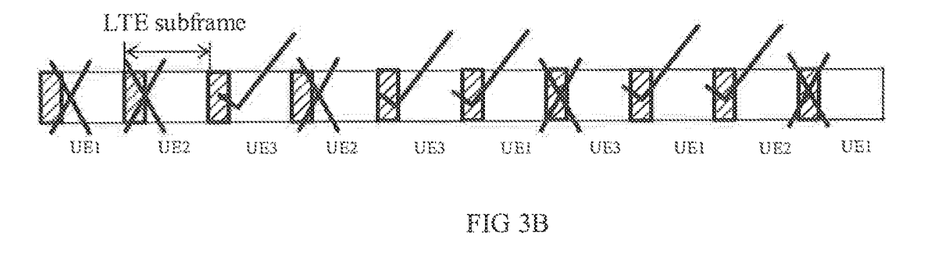
FIG. 3B shows an example of a channel sensing sequence.

According to the existing directional sensing solution, the AP may have to perform channel sensing for the served UEs one by one. If the AP performs channel sensing for the three UEs (i.e., UE1, UE2 and UE3) sequentially due to the limitation of the RX RF chain at the AP side, the AP may only complete the channel sensing for one UE within one subframe. In this case, if a channel sensed in one subframe is determined to be busy for a UE, then that subframe may not be used for channel sensing of other UEs, although the channel may be available for the other UEs in other directions. FIG. 3B shows an example of a channel sensing sequence, in which mark "X" indicates that the channel being sensed is busy and mark "✓" indicates that the channel being sensed is idle. As shown, even though the channel for UE 3 may be idle, it still has to wait for two subframes for sequentially sensing the channels of UE 1 and UE 2 before data can be transmitted to UE 3. Accordingly, the efficiency of resource utilization may be low.

Therefore, there is a need for a more efficient sensing solution applicable for a network involving resource sharing, especially for LAA networks.

SUMMARY

Various embodiments of the present disclosure mainly aim at providing an efficient sensing solution that is applicable for a network involving resource sharing, especially for LAA networks or also for WiFi networks. Other features and advantages of embodiments of the present disclosure will also be understood from the following description of specific embodiments when read in conjunction with the accompanying drawings, which illustrate the principles of embodiments of the present disclosure.

In a first aspect of the present disclosure, there is provided a method for data transmission at a communications device of a first type. The communications device of the first type can operate on both a licensed carrier and an unlicensed carrier, which may be a base station or a UE. The method comprises performing channel sensing on the unlicensed carrier, at different sensing slots within a time duration, for respective links directed to at least two communications devices of a second type. The communications devices of the second type can also operate on both the licensed carrier and the unlicensed carrier, which may be a communication counterparty of the communications device of the first type, for example a corresponding UE or a corresponding base station. The time duration is specified as a portion of a subframe in a frame structure used on the licensed carrier. The method further comprises scheduling transmission on a channel that is determined to be available based on corresponding channel sensing.

According to this method, within the time duration limited by the frame structure, channel sensing can be performed for more than one radio link in parallel. Thus, for frame-structure based channel sensing, especially in LAA networks, the efficiency of radio resource utilization may be enhanced and channel sensing overhead may be reduced.

In an embodiment, the method may further comprise grouping links directed to communications devices of the second type into two or more groups. In this embodiment, the respective links directed to the at least two communications devices of the second type may belong to a same group. In a further embodiment, the links directed to the communications devices of the second type may be grouped based on direction differences of those links. For example, the links with a largest directional difference may be grouped together so that the probability to find at least one available channel may be maximized.

In another embodiment, a period between two sequent channel sensing for each of the respective links may be smaller than a minimum length of any other transmission on the unlicensed carrier, so that any ongoing transmission which may affect the channel status will not be missed. Thus, accuracy of the channel sensing may be guaranteed.

In yet another embodiment, the method may further comprise randomly selecting a back-off window that comprises at least one sensing slot within the time duration for each of the respective links directed to the at least two communications devices of the second type. By this way, the channel sensing can be performed within a time period with a random length, and thus transmission may be started randomly, thereby reducing the collision possibility.

In yet another embodiment, the channel sensing may be performed alternately for the respective links according to channel sensing patterns predefined in respective back-off windows. In this embodiment, each of the channel sensing patterns specifies an arrangement of the at least one sensing slot comprised in the corresponding back-off window. Alternate channel sensing according to the predefined channel sensing patterns may be helpful for controlling the period between two sequent channel sensing to be smaller than the minimum length of other transmissions on the unlicensed carrier.

In yet another embodiment, the back-off window, at the end of which no channel sensing is performed may be extended for further channel sensing so as to confirm availability of the channel being sensed in that back-off window. By this way, the channel can be ensured to be free for data transmission.

In yet another embodiment, in response that the channel for a link for which a back-off window with a shortest length is selected is determined to be available based on the corresponding channel sensing, transmission may be scheduled on the channel for that link without further performing the channel sensing for other links. By this way, transmission delay may be statistically minimized to better meet the requirements of delay-sensitive data.

In yet another embodiment, in response that a result of the channel sensing for the link directed to a communications device of the second type indicates the channel for that link being busy, following channel sensing for that link may be skipped. In most cases, a channel which was sensed to be busy will not possibly become idle within a short time, e.g. a few symbols, and thus it is meaningless to re-sense such a channel within the short time. Instead, switching to sense other links may increase the possibility to find an available channel.

In a second aspect of the present disclosure, there is provided an apparatus that may be embodied at or as at least part of a communications device of a first type. The communications device of the first type can operate on both a licensed carrier and an unlicensed carrier, which may be a base station or a UE. Particularly, the apparatus comprises a channel sensing unit and a transmission scheduling unit. The channel sensing unit is configured to perform channel sensing on the unlicensed carrier, at different sensing slots within a time duration, for respective links directed to at least two communications devices of a second type. The communications devices of the second type can also operate on both the licensed carrier and the unlicensed carrier, which may be a communication counterparty of the communications device of the first type, for example a corresponding UE or a corresponding base station. The time duration is specified as a portion of a subframe in a frame structure used on the licensed carrier. The transmission scheduling unit is configured to schedule transmission on a channel that is determined to be available based on corresponding channel sensing.

In an embodiment, the apparatus may further comprise a link grouping unit that is configured to group links directed to communications devices of the second type into two or more groups. In this embodiment, said respective links directed to the at least two communications devices of the second type may belong to a same group. In a further embodiment, the link grouping unit may be configured to group the links directed to the communications devices of the second type based on direction differences of those links.

In another embodiment, a period between two sequent channel sensing for each of the respective links is smaller than a minimum length of any other transmission on the unlicensed carrier.

In yet another embodiment, the apparatus may further comprise a back-off window selecting unit that is configured to randomly select a back-off window that comprises at least one sensing slot within the time duration, for each of the respective links directed to the at least two communications devices of the second type.

In yet another embodiment, the channel sensing unit may be configured to perform channel sensing alternately for the respective links according to channel sensing patterns predefined in respective back-off windows. Each of the channel sensing patterns may specify an arrangement of the at least one sensing slot comprised in the corresponding back-off window.

In yet another embodiment, the channel sensing unit may further be configured to extend the back-off window, at the end of which no channel sensing is performed, for further channel sensing so as to confirm availability of the channel being sensed in that back-off window.

In yet another embodiment, the transmission scheduling unit may further be configured to, in response that the channel for a link for which a back-off window with a shortest length is selected is determined to be available based on the corresponding channel sensing, schedule transmission on the channel for that link without further performing the channel sensing for other links.

In yet another embodiment, the channel sensing unit may further be configured to, in response that a result of the channel sensing for the link directed to a communications device of the second type indicates the channel for that link being busy, skip following channel sensing for that link.

In a third aspect of the present disclosure, there is provided an apparatus that may be embodied at or as at least part of a communications device of a first type. The communications device of the first type can operate on both a licensed carrier and an unlicensed carrier, which may be a base station or a UE. The apparatus comprises a processor and a memory. The memory containing instructions executable by the processor, whereby the apparatus is operative to perform the method according to the first aspect of the present disclosure.

In a fourth aspect of the present disclosure, there is provided an apparatus that may be embodied at or as at least part of a communications device of a first type. The communications device of the first type can operate on both a licensed carrier and an unlicensed carrier, which may be a base station or a UE. The apparatus comprises processing means adapted to perform the method according to the first aspect of the present disclosure.

In a fifth aspect, there is provided a computer program product, comprising instructions which, when executed on at least one processor, cause the at least one processor to carry out the method according to the first aspect of the present disclosure.

It shall be appreciated that various embodiments of the first aspect may also be equally applied to the second, third, fourth and fifth aspect of the present disclosure.

BRIEF DESCRIPTION OF THE DRAWINGS

The above and other aspects, features, and benefits of various embodiments of the present disclosure will become more fully apparent from the following detailed description with reference to the accompanying drawings, in which.

Like reference numbers and designations in the various drawings indicate like elements.

DETAILED DESCRIPTION

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "yet another embodiment," etc. indicate that the embodiment described may include a particular feature, structure, or characteristic, but every embodiment may not necessarily include the particular feature, structure, or characteristic. Moreover, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms in association.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station", used herein may also be referred to as e.g. AP, eNB, eNodeB, NodeB or base transceiver station (BTS) etc. depending on the technology and terminology used. Likewise, the term "UE" used herein may refer to any terminal having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like. The terms "communications device of a first type" and "communications device of a second type" are used in this document to differentiate two communications parties, without necessarily specifying which communications device is a base station or which communications device is a UE.

For the purpose of illustration, the concept and principle of several embodiments of the present disclosure will be described in the context of LAA. Those skilled in the art will appreciate, however, that the concept and principle of the several embodiments of the present disclosure may be more generally applicable to other scenarios that may involve resource sharing with or without the frame structure limitation on an licensed carrier.

Figure 4:
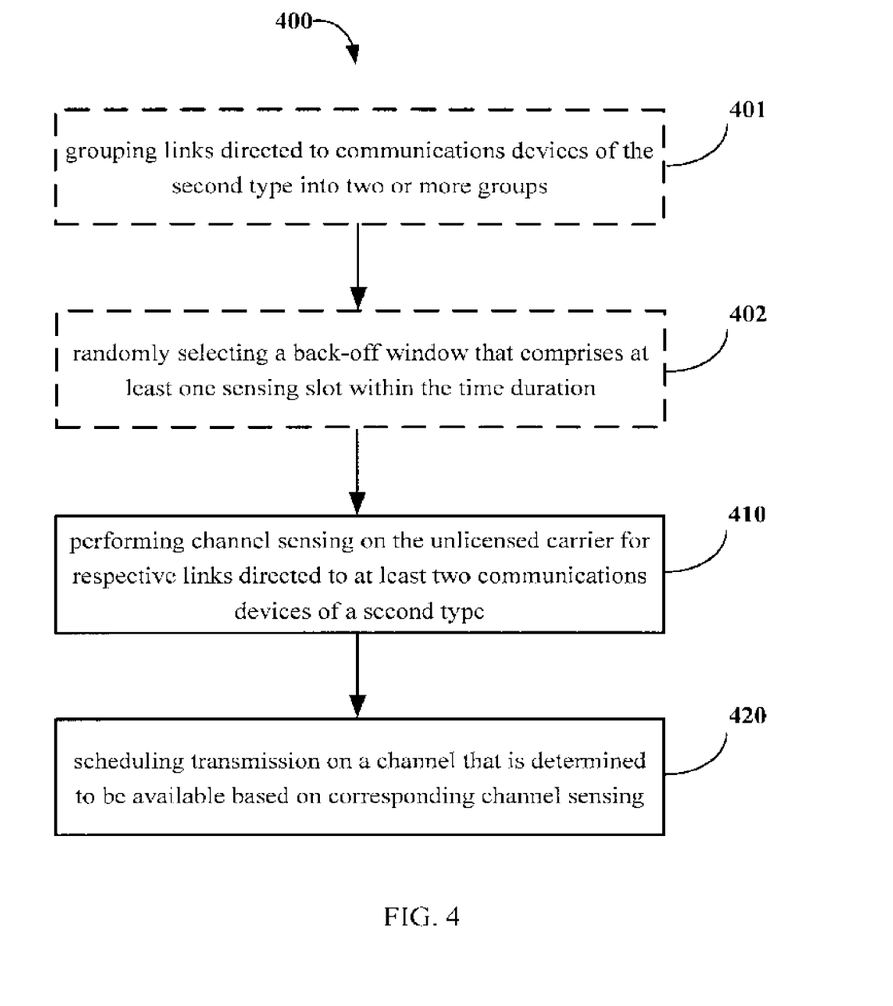
FIG. 4 illustrates a flowchart of a method for data transmission according to an embodiment of the present disclosure.

FIG. 4 illustrates a flowchart of an example method 400 for data transmission according to an embodiment of the present disclosure. The method 400 may be performed at a base station for data transmission to one or more UEs or at a UE for data transmission to one or more base stations. Hereafter, the communications device that performs the method 400 will be referred to as a communications device of a first type, while the communications device to which the transmission scheduled according to the method 400 is directed will be referred to as a communications device of a second type. The communications device of the first type and the communication device of the second type can operate on both a licensed carrier and an unlicensed carrier. For example, the communications of the first type and the communications device of the second device may be an eNB and a UE respectively in an LAA network, in which the eNB serves one or more UEs via a licensed carrier and an unlicensed carrier. The licensed carrier may be used to maintain a radio connection, while the unlicensed carrier may be used for data rate boost.

Without loss of generality, it is assumed that the communications device of the first type, e.g. a base station, is equipped with one RX RF chain and can provide more than one downlink radio links directed to more than one communications devices of the second type. The concept and principle of the method 400 may also be applied to the communications device of the first type equipped with more than one RX RF chain.

In FIG. 4, operations in blocks with a solid line are essential while operations in blocks with a broken line are optional depending on various implementations of the present disclosure. The method 400 will first be described from the essential operations.

As illustrated, the method 400 enters at block 410, in which the communications device of the first type performs channel sensing on the unlicensed carrier, at different sensing slots within a time duration, for respective links directed to at least two communications devices of the second type. The time duration may be specified as a portion of a subframe in a frame structure used on the licensed carrier. Taking the frame structure in LTE as an example, the time duration may be specified as a first few symbols of each subframe as shown in FIG. 2, e.g. the first three symbols. Alternatively, in WiFi systems without involving transmissions on licensed carriers, the time duration may be specified according to transmission timing on the unlicensed carrier.

Then, if any channel is determined to be available based on corresponding channel sensing, the communications device of the first may schedule transmission on a channel that is determined to be available at block 420.

Optionally, links from the communications device of the first type and directed to communications devices of the second type may be grouped into two or more groups at block 401, for example based on direction differences of those links. In this case, the above mentioned respective links directed to the at least two communications devices of the second type will belong to a same group.

Figure 5:
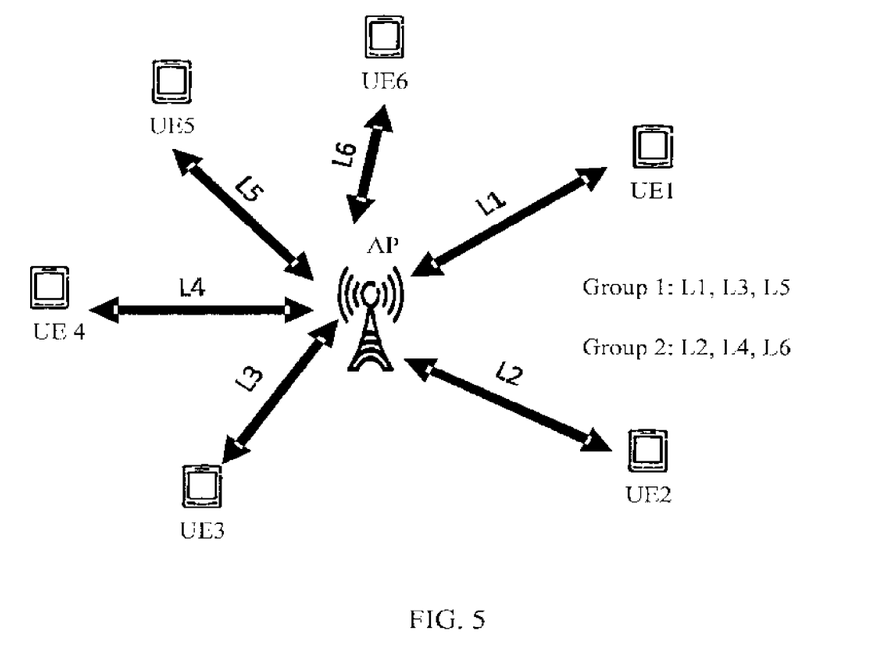
FIG. 5 illustrates an example of grouping links based on direction differences of links according to an embodiment of the present disclosure.

FIG. 5 illustrates an example of grouping links based on direction differences of the links according to an embodiment of the present disclosure. As shown, links L1, L3 and L5 may be grouped into a same group, while links L2, L4 and L6 may be grouped into another group. In this example, any two links with a larger directional difference may be grouped together. Thus, within any time duration, the channel sensing may be performed within the same group, in which any two links have the larger directional difference, thereby increasing the probability to find one available channel.

Additionally, the communications device of the first type may randomly select a back-off window within the time duration at block 402, for each of the links to be sensed. Each of the back-off windows may comprise at least one sensing slot. The channel sensing is limited within a corresponding back-off window. If a channel is sensed to be idle during the whole back-off window, that channel may be determined to be available. By this way, the channel sensing can be performed within a time period with a random length, and thus transmission may be started randomly, thereby reducing the collision possibility.

Preferably, the channel sensing may be performed alternately for the respective links directed to the at least two communications devices of the second type according to channel sensing patterns predefined in respective back-off windows. Each of the channel sensing patterns may specify an arrangement of the at least one sensing slot comprised in the corresponding back-off window. Alternate channel sensing according to the predefined channel sensing pattern may be helpful for controlling the period between two sequent channel sensing to be smaller than the minimum length of other transmissions on the unlicensed carrier.

Figure 6:
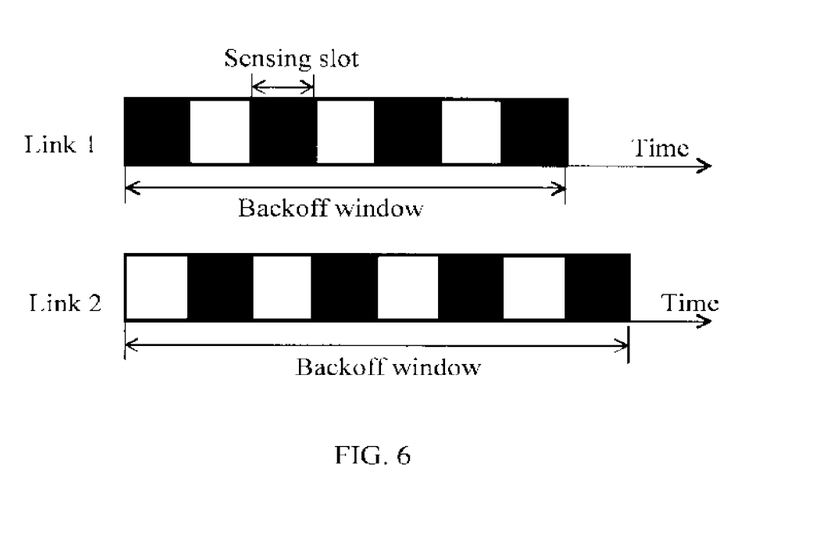
FIG. 6 illustrates two example channel sensing patterns according to an embodiment of the present disclosure.

FIG. 6 illustrates two example channel sensing patterns for link 1 and link 2. The channel sensing pattern for link 1 specifies the arrangement of the sensing slots comprised in the first back-off window at the top and the channel sensing pattern for link 2 specifies the arrangement of the sensing slots comprised in the second back-off window at the bottom, wherein black blocks represent the sensing slots while white blocks represent a gap between two sensing slots, during which no channel sensing is performed. According to the channel sensing patterns, the channel sensing may be performed for link 1 and link 2 alternately.

In FIG. 6, all sensing slots have the same length. However, different lengths may also be applied to the sensing slots. In either case, the period between two sequent channel sensing for each of the links is preferably smaller than the minimum length of any other transmission on the unlicensed carrier, so that any ongoing transmission which may affect the channel status of the link in discussion, for example transmission on the unlicensed carrier in another network adjacent to link 1 that may cause the channel for link 1 to be busy, will not be missed. Thus, accuracy of the channel sensing may be guaranteed.

In another embodiment of the method 400, the operation at block 410 of performing channel sensing may comprise, in response that a result of the channel sensing for a link directed to one of the at least two communications devices of the second type indicates the channel for that link being busy, skipping following channel sensing for that link.

Figure 7:
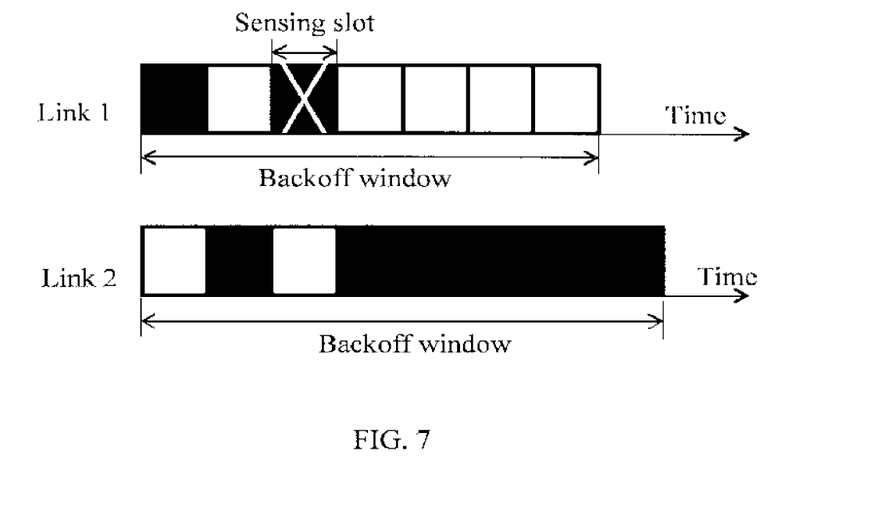
FIG. 7 illustrates an example of how to skip channel sensing for a link when the channel for that link is sensed to be busy according to an embodiment of the present disclosure.

As an example, FIG. 7 illustrates an example of how to skip channel sensing for a link when the channel for that link is sensed to be busy. As illustrated, the channel for link 1 is sensed to be busy at the second sensing slot, which is shown with an "X". Afterwards, the following channel sensing for link 1 may be skipped, which is shown with all white blocks after the second sensing slot in the channel sensing pattern for link 1. Then the channel sensing is switched to link 2, which is shown with all black blocks after the second white block in the channel sensing pattern for link 2. If there is an additional link to be sensed, the channel sensing may be further switched to the additional link and then performed alternately between link 2 and the additional link, e.g. according to predefined channel sensing patterns.

Preferably, before a channel can be surely determined to be available, channel sensing needs to be performed at the end of the back-off window in which the channel is sensed. Accordingly, in a further embodiment of the method 400, the back-off window, at the end of which no channel sensing is performed may be extended for further channel sensing so as to confirm availability of the channel that is sensed in that back-off window. By this way, the channel can be ensured to be free for data transmission.

It shall be appreciated that when a channel is sensed to be busy or idle, it means that that channel is busy or idle during a sensing slot in which this channel sensing is performed, while when a channel is determined to be available, it means that the channel is sensed to be idle during the whole back-off window in which the channel sensing is performed.

Figure 8:
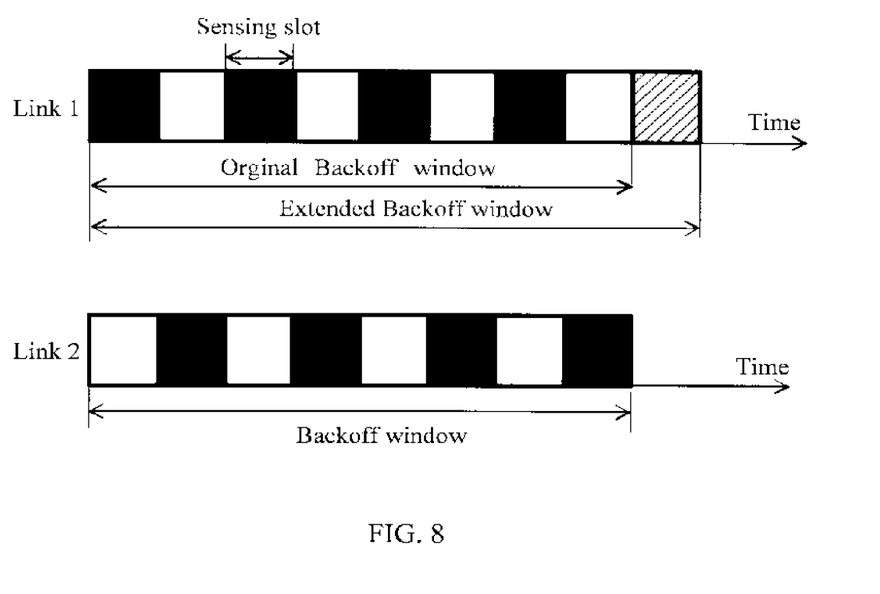
FIG. 8 illustrates an example of how to extend a back-off window for further channel sensing according to an embodiment of the present disclosure.

As an example, FIG. 8 illustrates how to extend a back-off window for further channel sensing so as to confirm availability of the channel that is sensed in that back-off window. According to the channel sensing pattern in an original back-off window for link 1 and the channel sensing pattern for link 2 as illustrated, the communications device of the first type, e.g. the base station, did not perform channel sensing at the end of the original back-off window for link 1, i.e. in the last sensing slot. Then, the original back-off window for link 1 may be extended by an additional sensing slot, which is shown with a diagonally-striped block in FIG. 8, in which further channel sensing may be performed for link 1. Unless the channel for link 1 is also sensed to be idle in this additional sensing slot, the channel for link 1 cannot be determined to be available even though that channel has been sensed to be idle in all previous sensing slots comprised in the original back-off window for link 1.

When there is one or more channels that have been determined to be available, different rules may be followed to decide on which available channel transmission shall be scheduled. As one example of the rules, if a channel for a link from the communications device of the first type, e.g. the base station, to the communications device of the second type, e.g. a UE, is determined to be available and meanwhile the back-off window selected for that link has the shortest length, then the communications device of the first type may schedule transmission on that channel and skip further channel sensing for all other channels. By this way, the transmission delay may be statistically minimized to better meet the requirements of delay-sensitive data.

As another example of the rules, the communications device of the first type, e.g. the base station may complete the channel sensing within respective back-off windows for all links being sensed. If there are multiple channels that are determined to be available, then the communications device of the first type may select a channel to schedule transmission thereon in consideration of some factors, such as with a highest amount of buffered data, a highest latency requirement, or a lowest received power from interfering channels and the like, aiming to offer better transmission performance.

Figure 9:
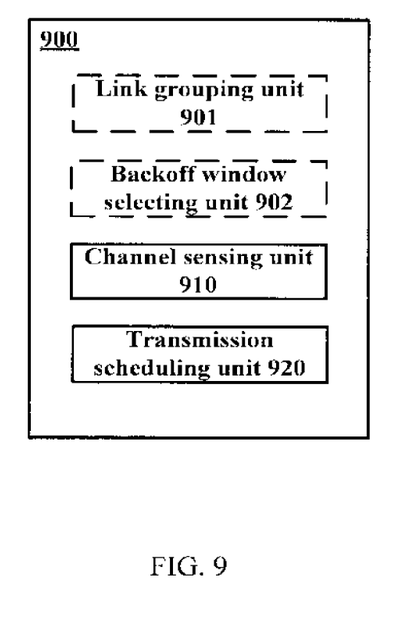
FIG. 9 illustrates a schematic block diagram of an apparatus adapted for data transmission according to an embodiment of the present disclosure.

FIG. 9 illustrates a schematic block diagram of an apparatus 900 adapted for data transmission according to an embodiment of the present disclosure. The apparatus 900 may be embodied at or as at least part of a base station for data transmission to one or more UEs or embodied at or as at least part of a UE for data transmission to one or more base stations. Hereafter, the communications device at which the apparatus 900 is embodied or comprising the apparatus 900 will be referred to as a communications device of a first type, while the communications device to which the transmission scheduled by the apparatus 900 is directed will be referred to as a communications device of a second type. The communications device of the first type and the communication device of the second type can operate on both a licensed carrier and an unlicensed carrier. For example, the communications of the first type and the communications device of the second device may be an eNB and a UE respectively in an LAA network, in which the eNB serves one or more UEs via a licensed carrier and an unlicensed carrier. The licensed carrier may be used to maintain a radio connection, while the unlicensed carrier may be used for data rate boost.

Without loss of generality, it is assumed that the communications device of the first type, e.g. a base station, is equipped with one RX RF chain and can provide more than one downlink radio links directed to more than one communications devices of the second type. The concept and principle of embodiments of the apparatus 900 may also be applied to the communications device of the first type equipped with more than one RX RF chain.

In FIG. 9, units in blocks with a solid line are essential while units in blocks with a broken line are optional depending on various implementations of the present disclosure.

Particularly, as illustrated in FIG. 9, the apparatus 900 comprises a channel sensing unit 910 and a transmission scheduling unit 920. The channel sensing unit 910 is configured to perform channel sensing on the unlicensed carrier, at different sensing slots within a time duration, for respective links directed to at least two communications devices of the second type. The time duration is specified as a portion of a subframe in a frame structure used on the licensed carrier. For example, the time duration may be specified as a first few symbols of each subframe as shown in FIG. 2. Alternatively, in WiFi systems without involving transmissions on licensed carriers, the time duration may be specified according to transmission timing on the unlicensed carrier. The transmission scheduling unit 920 is configured to schedule transmission on a channel that is determined to be available based on corresponding channel sensing.

In an embodiment, the apparatus 900 may further comprise a link grouping unit 901 that is configured to group links directed to communications devices of the second type into two or more groups, for example based on direction differences of those links. In this embodiment, the above mentioned respective links directed to the at least two communications devices of the second type will belong to a same group.

In another embodiment, a period between two sequent channel sensing for each of the respective links may be smaller than a minimum length of any other transmission on the unlicensed carrier, so that any ongoing transmissions which may affect the channel status of the link in discussion will not be missed. Thus, accuracy of the channel sensing may be guaranteed.

In a further embodiment, the apparatus 900 may further comprise a back-off window selecting unit 902 that is configured to randomly select a back-off window that comprises at least one sensing slot within the time duration, for each of the respective links directed to the at least two communications devices of the second type.

In yet another embodiment, the channel sensing unit 910 may further be configured to perform channel sensing alternately for the respective links according to channel sensing patterns predefined in respective back-off windows. Each of the channel sensing patterns specifies an arrangement of the at least one sensing slot comprised in the corresponding back-off window.

In yet another embodiment, the channel sensing unit 910 may further be configured to extend the back-off window, at the end of which no channel sensing is performed, for further channel sensing so as to confirm availability of the channel being sensed in that back-off window.

In yet another embodiment, the transmission scheduling unit 920 may further be configured to, in response that the channel for a link for which a back-off window with a shortest length is selected is determined to be available based on the corresponding channel sensing, schedule transmission on the channel for that link without further performing the channel sensing for other links.

In yet another embodiment, the channel sensing unit 910 may further be configured to, in response that a result of the channel sensing for the link directed to a communications device of the second type indicates the channel for that link being busy, skipping following channel sensing for that link.

The above units 901, 902, 910 and 920 may be configured to implement corresponding operations or steps and to achieve corresponding technical effects as described with reference to FIGS. 4-8, and thus will not be detailed herein for the purpose of succinctness.

Figure 10:
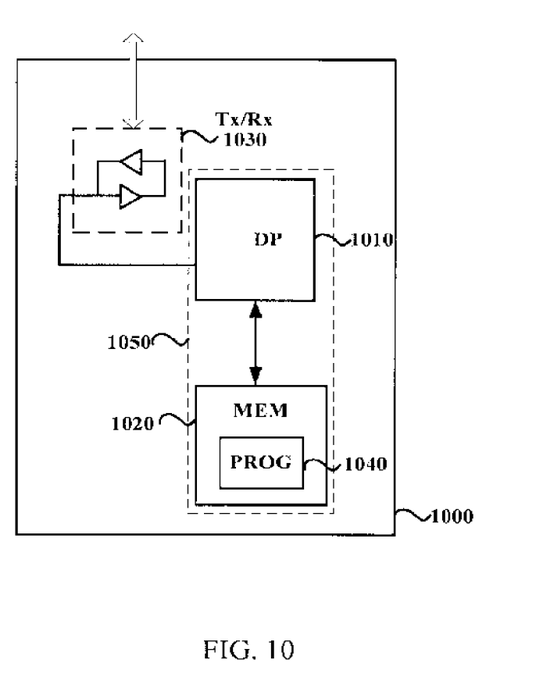
FIG. 10 illustrates a schematic block diagram of another apparatus adapted for data transmission according to an embodiment of the present disclosure.

FIG. 10 illustrates a schematic block diagram of an apparatus 1000 adapted for data transmission according to an embodiment of the present disclosure. The apparatus 1000 may be embodied at or as at least part of a base station for data transmission to one or more UEs or embodied at or as at least part of a UE for data transmission to one or more base stations.

The apparatus 1000 comprises at least one processor 1010, such as a data processor (DP) and at least one memory (MEM) 1020 coupled to the processor 1010. The apparatus 1000 may further comprise a transmitter TX and receiver RX 1030 coupled to the processor 1010 for establishing communications with other communications devices. The MEM 1020 stores a program (PROG) 1040. The PROG 1040 may include instructions that, when executed on the associated processor 1010, enable the apparatus 1000 to operate in accordance with the embodiments of the present disclosure, for example to perform the method 400. A combination of the at least one processor 1010 and the at least one MEM 1020 may form processing means 1050 adapted to implement some embodiments of the present disclosure.

The MEM 1020 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1010 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

A person skilled in the art shall appreciate that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for use in a wireless transmitter operable on a licensed carrier and an unlicensed carrier, the method comprising:
   performing a first channel sensing on the unlicensed carrier for a first channel directed to a first wireless receiver, wherein the first channel sensing is performed at a first sensing slot within a time duration;
   performing a second channel sensing on the unlicensed carrier for a second channel, different than the first channel, directed to a second wireless receiver, wherein the sensing is performed at a second sensing slot within the time duration; and
   wherein the time duration is specified as a portion of a subframe in a frame structure used on the licensed carrier.

2. The method of claim 1, wherein channels directed to wireless receivers are grouped into two or more groups, and the first channel and the second channel belong to a same group of the two or more groups.

3. The method of claim 2, wherein the channels directed to wireless receivers are grouped into two or more groups according to a transmission direction of the channels.

4. The method of claim 1, wherein a time period between the first channel sensing and the second channel sensing is smaller than a minimum length of any other transmission on the unlicensed carrier.

5. The method of claim 1, further comprising:
   selecting a first back-off window for channel sensing on the first channel;
   selecting a second back-off window for channel sensing on the second channel; and
   wherein each of the first back-off window and the second back-off window comprises at least one sensing slot within the time duration.

6. The method of claim 5, wherein:
   the first channel sensing and the second channel sensing are performed alternately according to a first channel sensing pattern and a second channel sensing pattern, respectively; and
   the first channel sensing pattern specifies an arrangement of the at least one sensing slot in the first back-off window and the second channel sensing pattern specifies an arrangement of the at least one sensing slot in the second back-off window.

7. The method of claim 5, further comprising extending at least one of the first and second back-off window, at the end of which no channel sensing is performed, for further channel sensing to confirm availability of the channel being sensed in the at least one of the first and second back-off window.

8. The method of claim 1, further comprising:
   determining the first channel is available based on the first channel sensing; and
   scheduling a transmission on the first channel before performing the second channel sensing.

9. The method of claim 1, further comprising:
   determining the first channel is busy based on the first channel sensing; and
   skipping a next scheduled channel sensing for the first channel.

10. A wireless transmitter configured to operate on a licensed carrier and an unlicensed carrier, the wireless transmitter comprising a processor and a memory coupled to the processor, the wireless transmitter operable to:
    perform a first channel sensing on the unlicensed carrier for a first channel directed to a first wireless receiver, wherein the first channel sensing is performed at a first sensing slot within a time duration;
    perform a second channel sensing on the unlicensed carrier for a second channel, different than the first channel, directed to a second wireless receiver, wherein the sensing is performed at a second sensing slot within the time duration; and
    wherein the time duration is specified as a portion of a subframe in a frame structure used on the licensed carrier.

11. The wireless transmitter of claim 10, wherein channels directed to wireless receivers are grouped into two or more groups, and the first channel and the second channel belong to a same group of the two or more groups.

12. The wireless transmitter of claim 11, wherein the channels directed to wireless receivers are grouped into two or more groups according to a transmission direction of the channels.

13. The wireless transmitter of claim 10, wherein a time period between the first channel sensing and the second channel sensing is smaller than a minimum length of any other transmission on the unlicensed carrier.

14. The wireless transmitter of claim 10, the wireless transmitter further operable to:
   select a first back-off window for channel sensing on the first channel;
   select a second back-off window for channel sensing on the second channel; and
   wherein each of the first back-off window and the second back-off window comprises at least one sensing slot within the time duration.

15. The wireless transmitter of claim 14, wherein:
   the wireless transmitter is operable to perform the first channel sensing and the second channel sensing alternately according to a first channel sensing pattern and a second channel sensing pattern, respectively; and
   the first channel sensing pattern specifies an arrangement of the at least one sensing slot in the first back-off window and the second channel sensing pattern specifies an arrangement of the at least one sensing slot in the second back-off window.

16. The wireless transmitter of claim 14, the wireless transmitter further operable to extend at least one of the first and second back-off window, at the end of which no channel sensing is performed, for further channel sensing to confirm availability of the channel being sensed in the at least one of the first and second back-off window.

17. The wireless transmitter of claim 10, the wireless transmitter further operable to:
   determine the first channel is available based on the first channel sensing; and
   schedule a transmission on the first channel before performing the second channel sensing.

18. The wireless transmitter of claim 10, the wireless transmitter further operable to:
   determine the first channel is busy based on the first channel sensing; and
   skip a next scheduled channel sensing for the first channel.

* * * * *